T. E. MURRAY, Jr., AND J. B. MURRAY.
METHOD OF ELECTRICAL WELDING.
APPLICATION FILED FEB. 4, 1920.
1,339,972.
Patented May 11, 1920.
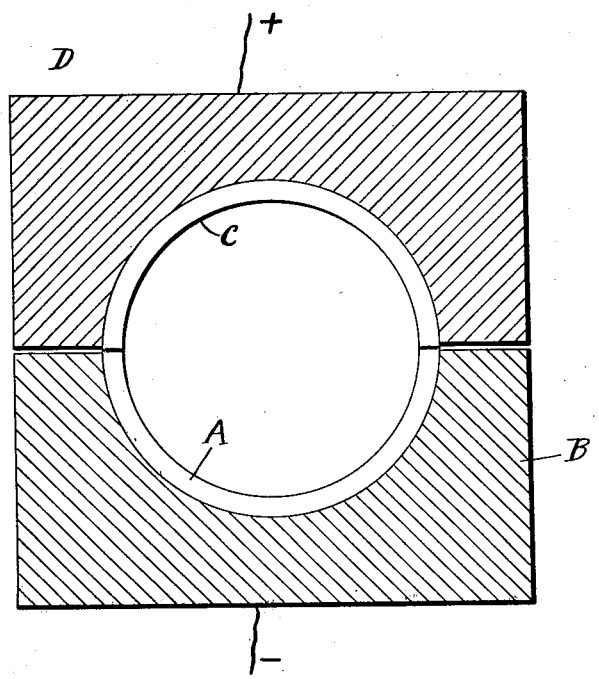
Inventors
Thomas E. Murray Jr.
Joseph B. Murray
By their Attorney

UNITED STATES PATENT OFFICE.

THOMAS E. MURRAY, JR., AND JOSEPH B. MURRAY, OF BROOKLYN, NEW YORK.

METHOD OF ELECTRICAL WELDING.

1,339,972.     Specification of Letters Patent.     Patented May 11, 1920.

Application filed February 4, 1920. Serial No. 356,128.

*To all whom it may concern:*

Be it known that we, THOMAS E. MURRAY, Jr., and JOSEPH B. MURRAY, citizens of the United States, residing at Brooklyn, in the county of Kings and State of New York, have invented a certain new and useful Improvement in Methods of Electrical Welding, of which the following is a specification.

In electrical welding, we find that if after the weld is made the work is taken from the electrodes, in which it is seated, and allowed to cool in the atmosphere, it becomes more or less distorted, and does not meet predetermined gage measurements. This seems to arise from the difference in temperature of the metal at the just formed weld and that existing elsewhere, resulting in the mass being much hotter along the welding joint and, therefore, more expanded, so that with the cooling of the joint, the contraction is sufficiently irregular to cause the contour of an object designed to be cylindrical, for example, to be more or less eccentric.

Our present invention is a method of overcoming this difficulty, and of producing the work of desired dimensions accurately in the electrodes, so that after removal therefrom no distortion occurs.

The accompanying drawing, illustrating a specific application of our method, shows in section two longitudinal half sections of a welded tube seated in conformably shaped recesses in electrodes.

We proceed as follows: The longitudinal half tube section A is seated in a semi-cylindrical recess in electrode B. The corresponding longitudinal half tube section C is placed with its edges in contact registry with the edges of section A. The electrode D, in which there is a semi-cylindrical recess similar to the recess in electrode B, is then placed upon the section C, so that said section will enter and become seated in the recess in said electrode D. The welding current being established, pressure is applied to the joint—as by moving the electrode D toward the electrode B—until the weld is completed. Both pressure and current are then stopped, and the work is left between the electrodes for a brief period of time, easily ascertained for any particular class of similar objects. As the metal at the joint is the hottest, and the heat is rapidly conducted away therefrom by the electrodes—which are preferably water cooled—the net result is a sufficient degree of equalization of the temperature of the whole object to permit of its removal from the electrodes without danger of distortion from whatever differential may exist between said joint temperature and the temperature elsewhere; and, at the same time, the retention of the object in the electrodes now acting substantially as a mold, keeps it in proper shape.

Obviously, this does away with any need of annealing the object after welding whether by removing it from the electrodes and cooling it elsewhere, or by keeping it in the electrodes and subjecting it to a current of lower heating capacity than the welding current. Desired gage measurement is preserved, and the finished objects may enter at once into structures, of which they form part, without any truing or machining.

We claim:

1. The method of electrical welding, which consists in seating the bodies to be united in recesses in electrodes, establishing the welding current and pressing said bodies together until the joint is completed, then stopping both the pressure and the welding current, and finally leaving said bodies in the electrodes for a period long enough to equalize the temperature at the joint with that of the metal elsewhere to a degree sufficient to prevent distortion of the work after removal thereof from said electrodes.

2. The method of electrical welding, which consists in seating the bodies to be united in recesses in electrodes, establishing the welding current and pressing said bodies together until the joint is completed, then stopping both the pressure and the welding current, and finally cooling said united bodies in said electrodes.

In testimony whereof we have affixed our signatures in presence of two witnesses.

THOMAS E. MURRAY, JR.
JOSEPH B. MURRAY.

Witnesses:
GERTRUDE T. PORTER,
MAY T. MCGARRY.